United States Patent Office 3,449,447
Patented June 10, 1969

3,449,447
METHOD OF PREPARING 1,1 - BIS(p - CHLORO-PHENYL)-2,2-DICHLORO-1-FLUOROETHANE
Douglas J. Hennessey, 47 Grayson Place, Teaneck, N.J. 07666, and Rudolfo Villarica, 24 S. H, Scout Ybardolaza, Quezon City, Rizal, Philippines
No Drawing. Filed May 16, 1967, Ser. No. 643,786
Int. Cl. C07c 25/00
U.S. Cl. 260—649
1 Claim

ABSTRACT OF THE DISCLOSURE 1,1-bis(p-chlorophenyl)-2,2-dichloro-1-fluoroethane is obtained in high yield in the reaction of 1,1-bis(p-chlorophenyl)-1-bromo-2,2-dichloroethane and chlorine trifluoride.

---

This invention relates to methods of preparing 1,1-bis (p-chlorophenyl)-2,2-dichloro-1-fluoroethane and 1,1-bis (p - chlorophenyl) - 2,2,2 - trichloro - 1 - fluoroethane, compounds which have useful insecticidal properties.

In the years immediately following the discovery of the insecticidal properties of DDT, intensive research was undertaken to develop related compounds which would have equal effectiveness against unwanted insects, and, at the same time, would be less toxic to mammals and would be effective against insect species which had developed resistance to DDT. Among the effective insecticidal compounds discovered were the following:

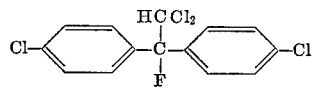

1,1-bis(p-chlorophenyl)-2,2-dichloro-1-fluoroethane and

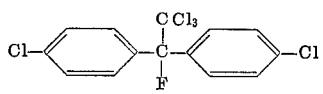

1,1-bis(p-chlorophenyl)-2,2,2-trichloro-1-fluoroethane

A method of preparing these compounds is disclosed by Cohen et al., J.A.C.S., 79, 5979 (1957). The yield of product obtained by this method, however, is disappointingly low, being only about 37% of the theoretical amount.

We have now discovered that, by using as a starting compound 1,1 - bis(p - chlorophenyl - 1 - bromo - 2,2-dichloroethane, and reacting it with chlorine trifluoride, compound (I) can be obtained in yields up to about 86% or more of the theoretical amount. The starting compound can be prepared by methods taught by John Gregory DeMarco in "Synthesis and Structure-Lethality Relationships of 2,2-bis(p-chlorophenyl)-1,1,2-trisubstituted ethane Compounds," a doctoral dissertation dated Sept. 23, 1966, in the library of Fordham University, Bronx, New York. The fact that this chlorine trifluoride reaction is useful in this instance is quite surprising, in view of statements in the literature to the effect that the action of chlorine trifluoride upon organic compounds is too energetic to be of practical value. See, for example Hudlicky, "Chemistry of Organic Fluoride Compounds," 60 (1962).

This reaction proceeds according to the following scheme:

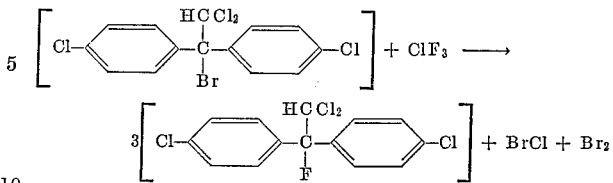

It can thus be seen that, for each mole of starting compound, approximately ⅓ mole of chlorine trifluoride is needed. An excess of chlorine trifluoride, however, may be used; the amount of this reactant may be present in amounts up to ⅔ mole per mole of starting compound.

This is a low temperature reaction and should be run at temperatures below about 10° C., preferably below 0° C. Solvents for the reaction include all those in which the reactants and products are inert. A convenient solvent was found to be carbon tetrachloride.

The product of the chlorine trifluoride reaction, compound (1), may then be chlorinated in the presence of light according to well-known procedures, to obtain the trichloro derivative, compound (II).

Further details concerning the preparation of these compounds are indicated in the following examples, which are here included for purposes of illustration only.

Example I.—1,1-bis(p-chlorophenyl)-2,2-dichloro-1-fluoroethane

Into a TFE polymer bottle containing 4.0 grams (0.010 moles) of 1,1-bis(p-chlorophenyl)-1-bromo-2,2-dichloroethane in 40 ml. of carbon tetrachloride was bubbled 0.6 grams (0.0065 moles) of chlorine trifluoride gas at a temperature of —5° C. The solution turned brown indicating the liberation of bromine. After 15 minutes, the excess chlorine trifluoride and bromine was reduced by aqueous potassium iodide and the iodine, in turn, was reduced by sodium thiosulphate. After extraction with ether and drying of the extracts over anhydrous sodium sulphate, the solvents were stripped. Crystallization of the oily product from pentane yielded 2.9 grams, melting point 100–102° C. Yield 86%.

Example II.—1,1-bis(p-chlorophenyl)-2,2,2-trichloro-1-fluoroethane 2.5 grams of the product of Example I, in refluxing solution with 20 ml. of carbon tetrachloride, was irradiated with light while chlorine was introduced into it through sintered glass tube. The reaction was stopped after one hour and a half. The solvent was stripped under reduced pressure. The oily product was then crystallized from pentane, yielding 1.74 grams with a melting point of 74–78° C. The material was then recrystallized from pentane, and a final product was obtained which melted at 80–81.5° C.

We claim:
1. A method of preparing 1,1-bis(p-chlorophenyl)-2,2-dichloro-1-fluoroethane which comprises reacting 1,1-bis (p-chlorophenyl)-1-bromo-2,2-dichloroethane with chlorine trifluoride in a carbon tetrachloride solvent at a temperature of from about —5° C. to about 10° C.

References Cited

Cohen, et al.: J. Am. Chem. Soc. 79 5979–5981 (1957).

DANIEL D. HOROWITZ, Primary Examiner.